(12) United States Patent
Coonan et al.

(10) Patent No.: US 6,284,192 B1
(45) Date of Patent: Sep. 4, 2001

(54) EXTRUDING ELECTRODE MATERIAL

(75) Inventors: Everett W. Coonan; Paul D. Frayer; Roy J. Monahan, all of Painted Post; Kathleen A. Wexell, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/429,132

(22) Filed: Oct. 28, 1999

Related U.S. Application Data

(60) Provisional application No. 60/106,660, filed on Nov. 2, 1998.

(51) Int. Cl.[7] ............................................. B22F 3/20
(52) U.S. Cl. .............................. 419/65; 419/67; 419/36
(58) Field of Search ................................ 419/65, 67, 36

(56) References Cited

U.S. PATENT DOCUMENTS

| | | |
|---|---|---|
| 3,101,511 | 8/1963 | Heston . |
| 4,547,278 * | 10/1985 | Hall et al. .................. 204/290 R |
| 4,859,383 * | 8/1989 | Dillon ................................ 264/43 |
| 4,945,125 * | 7/1990 | Dillon et al. ................... 527/427 |
| 5,393,213 | 2/1995 | Murata et al. . |
| 5,728,337 | 3/1998 | Yoshikawa et al. . |

FOREIGN PATENT DOCUMENTS

| | | |
|---|---|---|
| 0 490 361 B1 | 7/1994 | (EP) . |
| 0 709 176 A2 | 5/1996 | (EP) . |

* cited by examiner

*Primary Examiner*—Daniel J. Jenkins
(74) *Attorney, Agent, or Firm*—Milton M. Peterson

(57) ABSTRACT

A method of extruding an electrode, batch material, particularly a zinc or nickel, electrode material, and an extruder assembly for extruding the material, are described. The method and extruder are designed to produce a low compaction of the material and low, back pressure, whereby working of the batch material is limited.

10 Claims, 3 Drawing Sheets

EXTRUDING ELECTRODE MATERIAL

This application claims priority to provisional application No. 60/106,660 filed Nov. 2, 1998

FIELD OF THE INVENTION

Method and extruder assembly for extruding electrode material.

BACKGROUND OF THE INVENTION

Rechargeable batteries, based on nickel-zinc cells, have drawn attention from time to time since at least the 1930s. These batteries offer potential advantages over other rechargeable, alkaline systems in terms of energy output and/or cost. For example, a nickel-zinc battery potentially equals the performance of a silver-zinc battery, but at an obviously lower, material cost.

The nickel-zinc battery has been plagued with abbreviated life and installation cost. These problems have arisen largely due to difficulties in production, and behavior in use, of the electrodes, particularly the zinc electrode. During normal cycling, the zinc electrode tends to replate in a non-uniform manner during recharging. Also, dendrites, growing out from the zinc electrode, tend to cause short circuiting during discharge of the battery.

Recently, attention has been directed to the potential that the nickel-zinc battery has, as a replacement for the lead-acid battery, in automotive vehicles. This replacement would be particularly desirable since the nickel-zinc battery could provide a substantially greater, driving range before recharging.

Currently, however, except for special applications, there is no commercial production of a nickel-zinc battery. A major factor lies in the problems that arise in production and use of the electrodes.

There is, then, an apparent need for improvements in the manufacture of electrodes for a nickel-zinc battery. This is particularly true of the zinc electrode which appears to be the primary source of problems.

It is a basic purpose of this invention to meet the need for improved, electrode production.

Another purpose is to provide a stronger, more homogeneous material for production of zinc and nickel electrodes.

A further purpose is to provide a rapid, efficient and cost-effective process for extrusion of electrode material.

A still further purpose is to provide a novel, extruder assembly for processing electrode material.

BRIEF SUMMARY OF THE INVENTION

The invention resides, in part, in a method of extruding a zinc or nickel, electrode material which comprises mixing a homogeneous batch of raw materials composed predominantly of a source of zinc or nickel and also containing a small amount of essentially unfibrillated polytetrafluoroethylene (PTFE), feeding the batch to an extruder, conveying the batch material through a first portion of the extruder, then generating a controlled degree of fibrillation, conveying the batch through a second portion of the extruder to a forming member, and extruding the batch material through the forming member.

The invention further resides in an extruder assembly for extruding zinc or nickel, electrode materials which comprises an intermeshing, twin screw extruder, a smooth wall, twin tubular member within which the feeder operates, the twin tubular member having an opening through which batch material is fed to the intermeshing, twin screw extruder, the extruder having an initial, flighted portion that conveys the material forward while generating a degree of pressure to effect a limited fibrillation of polytetrafluoroethylene in the batch, the extruder having a second portion that is unflighted and that extends into a forming section of the twin tubular member, whereby a twin tubular, electrode material is extruded.

DESCRIPTION OF THE INVENTION

Figure 1:
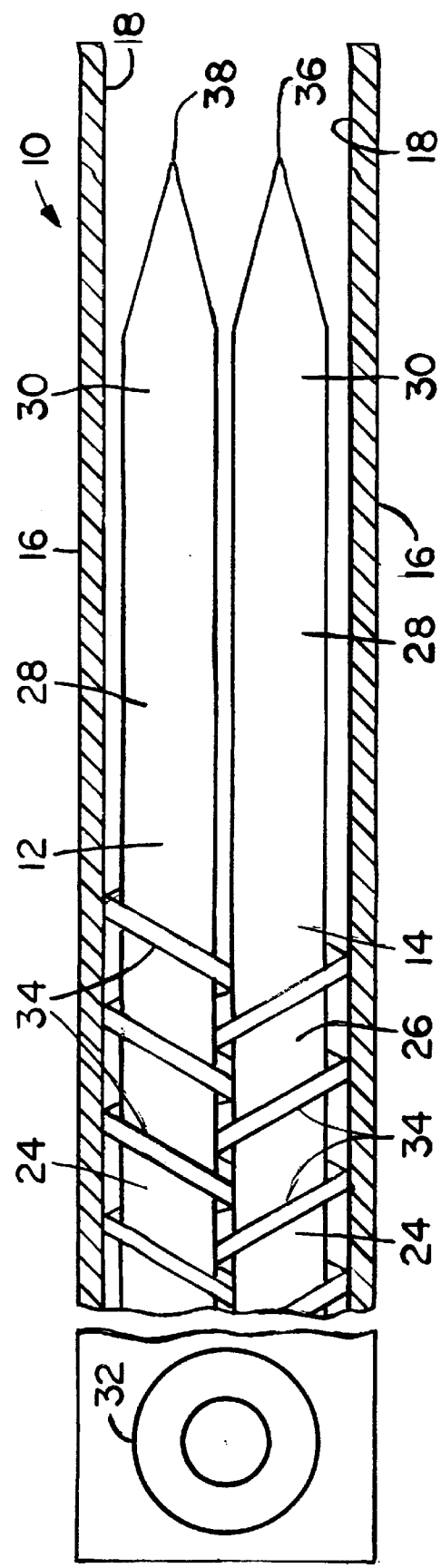
FIG. 1 is a top, plan view of an extruder in accordance with the invention with a portion of the extruder barrel removed.

Heretofore, zinc, electrode material has been processed in the form of a thin, rolled sheet by calendering. While successful in a technical sense, this procedure involves so many steps that it could not become a viable, cost-effective process for production purposes.

Accordingly, the present invention arose from studies directed at developing an extrusion method that could be effectively transferred to manufacturing operations. Experience indicated that a method devised for processing a zinc, electrode batch could be readily adapted to producing a nickel electrode.

Efforts to employ conventional, extrusion equipment and techniques in processing zinc, electrode material in sheet form consistently failed. Ram, single screw and twin screw extruders were employed with numerous, different adapters and dies. Pressure build-up tended to over-compact the material in the extruder. This squeezed the organic lubricant out of the material in a manner similar to squeezing water out of sand. In turn, high pressure and excessive torque were generated, causing the extruder to seize up. This necessitated a shutdown.

To the extent that a product could be produced, it tended to lack strength to permit further handling. Thus, it became apparent that a new approach was necessary. Further, this would have to be an approach, based on low, back pressure and low compaction, that catered to the unique, theological characteristics of the zinc, electrode material.

A basic feature of conventional, extrusion processes involves use of adapters and/or dies at the end of the extruder. These tend to create a high, back pressure in the extruder. Experience indicated that a head pressure greater than about 100 psi must be avoided to prevent undue loss of lubricant, and consequent seizing-up of the extruder. Since dies and adapters created much greater, back pressures, it became apparent that a successful extruder had to avoid use of such devices.

The present invention provides a unique method and extruder for extruding zinc and nickel, electrode materials. Therefore, the invention is further described with respect to the method steps, and to extruders designed to carry out those steps. The method steps include preparation of the batch for the material, feeding and extrusion of the batch, and, optionally, cutting of a twin tubular body to form a flat sheet.

A conventional, zinc, electrode batch, heretofore used for calendering, was employed for extrusion studies. It is recognized that batch composition studies might produce improvements. Therefore, the invention is not confined to the particular batch used.

The batch consisted of the following solids in weight percent (wt. %) and volume fraction (VF):

| Component | Wt. % | VF |
|---|---|---|
| ZnO | 64.5 | 0.4650 |
| Ca(OH)2 | 25.0 | 0.4562 |
| PbO | 8.0 | 0.0343 |
| PTFE | 2.5 | 0.0435 |

The solids were mixed with an organic lubricant to form a homogeneous mixture for extrusion. The lubricant used was a hydrocarbon mixture obtained from Shell Oil Co. under the designation 340 HT. Other lubricants can be used, hexylene glycol and tridecanol having been used with good results. Amounts varying from 20–40% were tried with about 30% being most effective for the present method.

The PTFE (polytetrafluoroethylene) is a key ingredient that is used in unfibrillated form as sub-micron (about 0.2 microns) particles. These particles stretch into fibers that form a web-like network. This network becomes the supporting backbone of a sheet of extruded material that permits subsequent handling and processing.

Formation of the PTFE, fiber network has been found to also be a key factor in setting up of a batch in an extruder. As the batch is worked in the extruder, the fiber network becomes more entangled, strain hardening occurs, lubricant squeezes out, and the extruder seizes up. Formation of the fiber network is known as fibrillation. It is vital that it occurs, but it is equally vital that the timing, and the degree to which it occurs, be controlled.

Briefly, the present invention centers on extruding a zinc or nickel, electrode material under conditions whereby fibrillation of PFTE in the batch material is largely limited to a selected zone in an extruder. To this end, pressure on the material, particularly back pressure in the extruder, is essentially limited to development in this zone. The invention is further described with respect to accomplishment of this necessary effect.

An initial step is mixing of the batch components to provide a homogeneous batch for extrusion. In the procedure adopted, the solids were well mixed, and the lubricant added, in a blender. The lubricant must be uniformly dispersed in the dry batch to provide a homogeneous mix. This must be accomplished while minimizing the effects of shear on fibrillation of the PTFE. The occurrence of the fibrillation was observed by microscopic examination of a material, for example, at a magnification of 5000 X.

Various blenders, and patterns for component addition, were tested without achieving homogeneity while avoiding fibrillation of the PFTE. A homogeneous mix, with little or no fibrillation, was finally achieved with a Model C420303 blender supplied by Patterson-Kelley. This blender has a low attrition bar attachment.

The solid components of the batch are first mixed to a homogeneous mass. Then a proper amount of the organic lubricant is pumped into the blender while the attrition bar is rotating. With exercise of proper controls, fibrillation of the PFTE particles is essentially avoided.

It is a common practice to use a feed screw, mounted within a tubular member, to feed batch material to an extruder. The tubular member is attached to an opening in a front section of the main, extruder barrel, usually at a right angle thereto. This practice was initially adopted, but was found to apply sufficient pressure to the batch material to cause undesired pre-fibrillation of the PFTE.

It was found necessary to remove the tubular attachment associated with the extruder. A slide chute was then attached to the extruder barrel. This allowed batch material to be delivered directly to the flighted extruder without application of pressure. Thus, compaction and pre-fibrillation of the batch prior to the actual extrusion process, were avoided.

Conventional, extrusion practice employs a single screw, or twin screw, extruder to mix a batch as it is conveyed to a die and/or adapter at the end of the extruder barrel. The screw member(s) are mounted to be rotated within an extruder barrel. A screw member comprises a long rod having flights arranged at an angle to a transverse plane. The angle, known as the pitch, causes batch to be conveyed, that is, moved forward, through the barrel.

The combination of the flighted, screw members with the die or adapter create a back pressure that may be as much as 1000 psi. As noted earlier, this high, back pressure created too much fibrillation of the PFTE. This ruled out conventional, extrusion practice in extruding batch materials for the present purposes.

It became necessary, therefore, to develop an extruder, and an extrusion process using such extruder, that are essentially diametrically opposite to that heretofore known and practiced. The present process is characterized by low compaction and low, controlled, back pressure. A limited amount of back pressure, preferably not over 100 psi, is necessary, and is developed as hereafter described. A first step was to eliminate any form of die or adapter that would create back pressure.

Attempts to use an extruder with a single screw indicated that a steady, stable process required a pressure of at least 750 psi. Since such high pressures could not be tolerated, the single screw extruder was abandoned in favor of an intermeshing, twin screw extruder, hereafter, twin screw extruder.

A twin screw extruder offers several advantages. The pumping action approaches that of a positive displacement pump. Thus, lower pressure operation is possible without air entrapment. Also, the batch material is conveyed better in the feed zone. There is not a dependence on a difference in coefficients of friction between the screw surface and the interior wall of the barrel.

A Leistritz, twin-screw, extruding apparatus with a 34 mm., twin tubular barrel was employed. This apparatus had seven sections, but the initial three were effectively excluded. The batch material was fed directly to the twin screw extruder at section four as described earlier.

The extruder was operated in conventional manner, that is with the twin screws operating in a co-rotational mode. After several trials, it became apparent that it would be necessary to operate the extruder at very high, extrusion rates. To adopt these high rates would require major changes in feeding and conveying the batch material.

Fortunately, at this point, a key discovery was made that obviated the need for such major changes. This discovery resulted from a trial run in which the twin screw extruder was operated in a counter-rotational mode. In this mode, the screws were rotated inwardly, that is, toward each other. This was accomplished by changing the electrical phase of the motor that powered screw rotation.

Counter-rotation of the screws provides a more positive, material conveying action. It also imparts less shearing action, thus avoiding premature fibrillation. Even more important than the mode of rotation is the direction of rotation. The top surfaces of the screws, rotating toward each other, result in much more efficient material pick-up, conveying and throughput. This provides manufacturing efficiency. Also, the rheology of this material is such that it flows more easily at high, flow rates.

Practice of the present invention involves a combination of sub-processes, or steps, in addition to the step of feeding batch to the extruder screws. These include conveying/feeding the batch through the extruder barrel, fibrillating the PFTE in a controlled manner, and imparting a desired shape to the extrudate.

To accomplish these steps successfully, it has been necessary to devise an extruder that departs radically from the conventional design. Omission of dies and adapters, the normal sources of back pressure in an extruder, has already been noted. These normal accessories are replaced by an extension of the extrusion barrel that functions as a shaper or former. It has also been observed that only a portion of the normal, extruder barrel is employed, that the normal, feed tube is replaced, and that the rotation mode of the twin screw extruder is reversed. Further changes will be described with reference to the accompanying drawings.

The redesigned extruder has been dubbed a "barrel die" mainly because the twin tubular barrel functions, in conjunction with unflighted sections on the screw members, to form the extruded article.

Normally, the extruder screws have flighted elements over the whole length of the extruder barrel sections. The "barrel die" has no flighted elements over its last section. The smooth, unflighted, "screw" sections are enclosed by the barrel sections. Together, they form and shape the electrode material. The barrel sections are polished to facilitate some slippage along the barrel walls. The extrudate formed as a result of this method is in the form of two adjacent tubes. These can be slit and laid flat for rolling to proper thickness downstream.

The key to the operation of this "barrel die" design is the balance of pressure forward off the flighted elements and back-pressure developed from the smooth, non-flighted elements and barrel walls (i.e., resistance to flow due to sliding friction). Too much back pressure will set up the extruder, while too little will not work the PTFE sufficiently to create the backbone necessary for further processing.

FIG. 1 in the accompanying drawing is a top, plan view of the unique, twin screw extruder 10 that was devised for practicing the present, inventive method. The top half of barrel 16, within which twin screws 12 and 14 are rotated, has been omitted to better show the screws.

Figure 2:
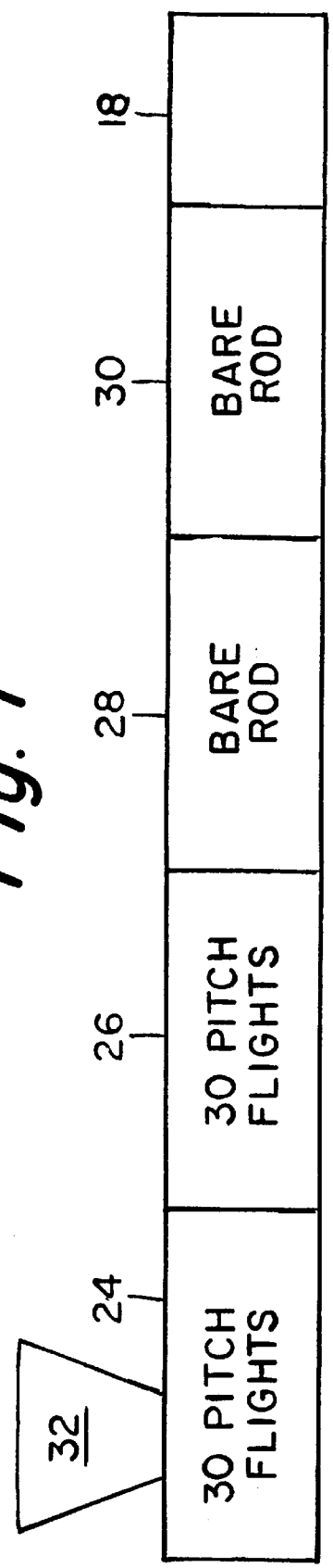
FIG. 2 is a schematic illustration of the extruder of FIG. 1.

FIG. 2 is a schematic illustration of the extruder sections and the function of each section.

Homogeneous, batch material is introduced into section 24 of extruder 10 from a feed member 32. As described above, member 32 may be a chute arrangement. Thereby, the batch is not subjected to pressure that would fibrillate the PTFE component appreciably.

Flights 34 on twin screws 12 and 14 in sections 24 and 26 have 30 degree and 20 degree pitches, respectively. They serve primarily to convey material forward to sections 28 and 30. They are designed to thoroughly knead the batch material while applying only sufficient pressure to convey the material forward.

The batch material then moves into sections 28 and 30 of the extruder where screws 12 and 14 are unflighted. In these sections, the batch is formed in adjacent, double tubular form as it is delivered to forming section 18. This twin tubular form is delivered off the tips 36 and 38 of screws 12 and 14 which extend into section 18 of twin tubular barrel 16.

Friction between the batch material and the smooth wall of barrel 16 generates some back pressure. This pressure, together with that generated by forming section 18, is countered by pressure developed by flights 34 in sections 24 and 26. This pressure is sufficient to create the limited degree of fibrillation in the PTFE that is desired in the extrudate.

Figure 3:
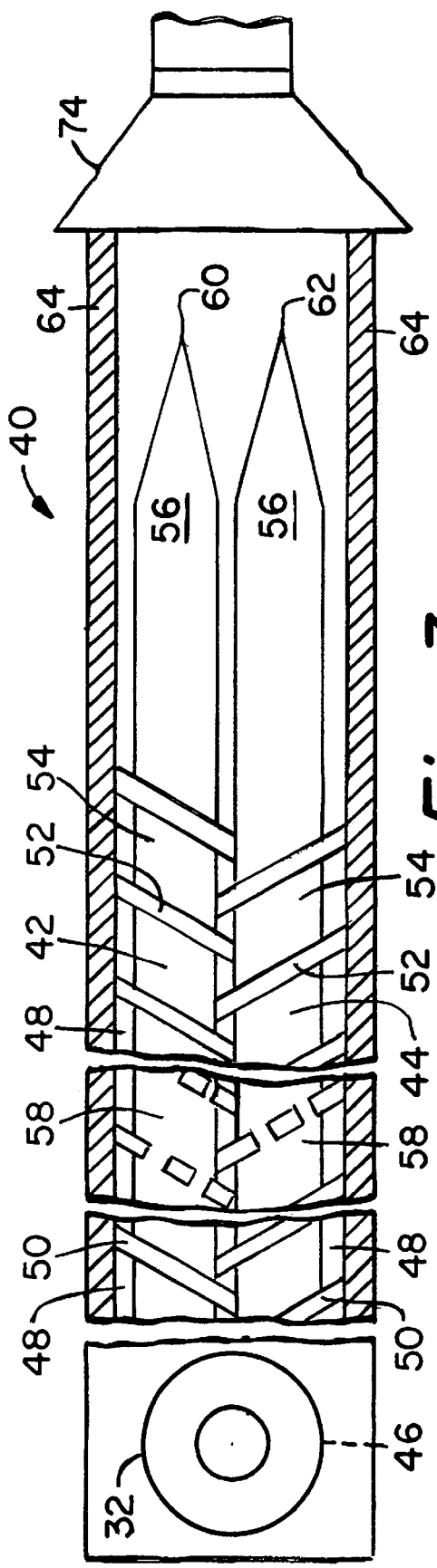
FIG. 3 is a top, plan view of a modified form of the extruder of FIG. 1, again with a portion of the extruder barrel removed.

FIG. 3 is a top, plan view of a modified version 40 of the extruder shown in FIG. 2. In this version, the twin screws 42 and 44 are flighted in sections 46 and 48 to feed and convey the batch material forward as in FIG. 1. However, the flights 50 in section 46 under feed chute 36 are relatively large pitch, open elements. This maximizes the volume of material picked up and fed forward.

Flights 52 in the following section 48 have a smaller pitch, for example, a 20° pitch. This develops somewhat more pressure to pump batch material across the subsequent sections. The flighted portion of the screws in the first two sections 46 and 48 of extruder 40 simply convey as much material as possible, without doing any significant working of the material. It has been confirmed by microscopy that virtually no fibrillation occurs in these sections.

Section 54 is where fibrillation of the PTFE takes place. A short, first portion has very large pitch, hexalobal, kneading elements 58. These cause extensional flow that fibrillates the PTFE very efficiently. Because they don't convey or pump very well, they are followed by a longer section of 20 degree pitch, conveying flights. This portion pumps material across the smooth, unflighted elements of the screw portions in section 56 of extruder 40. As in FIG. 1, the tips 60 and 62 of twin screws 42 and 44 extend into forming section 64 of barrel 66.

Some additional fibrillating takes place in the flighted portion of the screw sections following the hexalobals in the first portion of section 54. We believe this occurs because of some shearing action which happens as a consequence of the elements in section 48 pumping against the back pressure generated in section 56 and forming section 64 of extruder 40.

Figure 4:
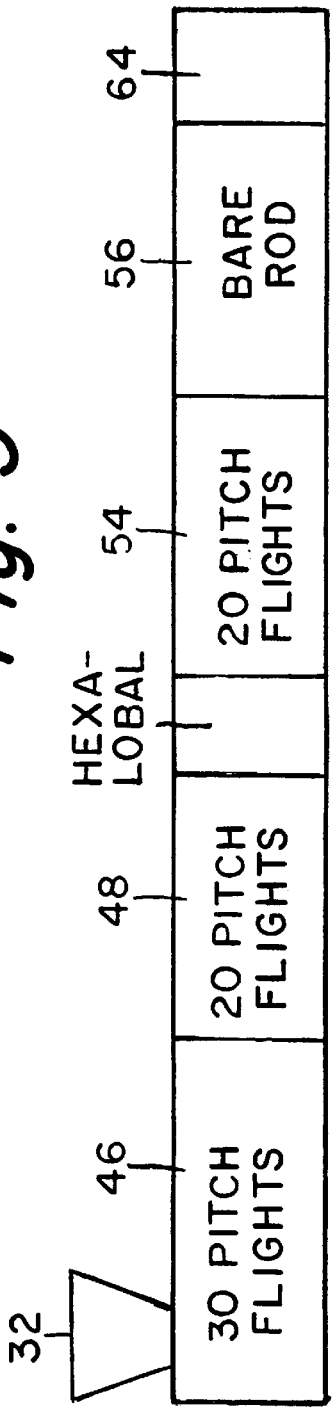
FIG. 4 is a schematic illustration of the extruder of FIG. 3.

FIG. 4 is a schematic illustration showing the nature of the sections 46, 48, 54, 56 and 64 of extruder 40. It also shows the functions as in FIG. 2.

Figure 5:
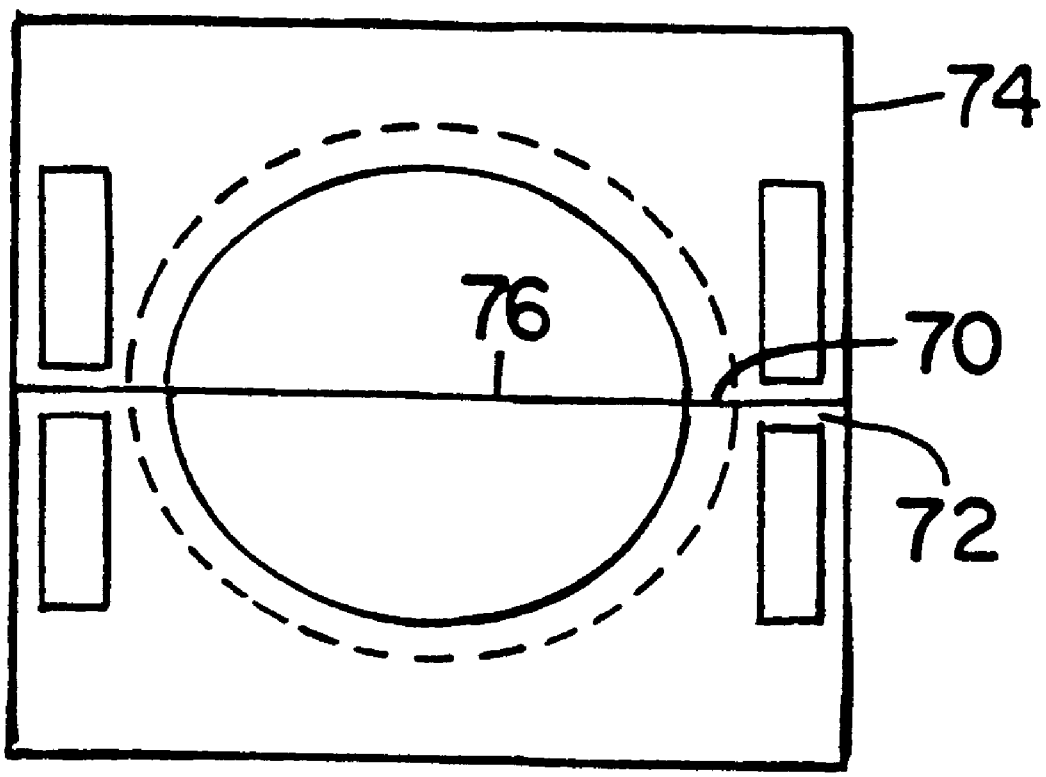
FIG. 5 is a front, side view of a cutting member attachment to the extruders of FIGS. 1 and 3.

FIG. 5 is a front, end view of extruder 10 or 40 showing a cutting member 70 mounted on the front of forming members 18 and 64. Cutting member 70 is attached to a tie rod plate 72 of the extruder 40 by a mounting adapter 74. The blade 76 of cutting member 70 is horizontal to the face of extruder 10 or 40.

The extrudate emanates from forming sections 18 or 64 as two adjacent tubes that form a horizontal FIG. 8. Blade 76, as shown in FIG. 5, is so mounted to slit the extruded, dual tube and lay it flat for further processing, for example, rolling to a proper thickness. The combination of cutting member 70 and forming sections 18 or 64 creates a small back pressure which enhances fibrillation sufficiently to increase material strength, but not enough to cause the extruder to seize up in continuous processing.

We claim:

1. A method of extruding a zinc or nickel, electrode material which comprises mixing a homogeneous batch of raw materials composed of a source of zinc or nickel and also containing, as an additive, essentially unfibrillated polytetrafluoroethylene (PTFE), feeding the batch to an extruder, conveying the batch material through a first portion of the extruder, then generating a controlled degree of fibrillation, conveying the batch through a second portion of the extruder to a forming member and extruding the batch material through the forming member.

2. A method of extruding an electrode material in accordance with claim 1 which comprises developing a small, back pressure in the second portion of the extruder and countering this with a limited pressure developed in the first portion, the pressure in the first portion being sufficient to develop a sufficiently limited degree of fibrillation and to move the batch material in continuous manner through the extruder.

3. A method of extruding an electrode material in accordance with claim 1 which comprises forming a blend of solid materials and lubricant in a blender with a low attrition bar, and adding the lubricant to the solids while rotating the low attrition bar.

4. A method of extruding an electrode material in accordance with claim 1 which comprises adding an organic lubricant in an amount equal to about 30% by weight of the solids.

5. A method of extruding an electrode material in accordance with claim 1 which comprises feeding the batch material to an extruder with a minimal generation of fibrillation by avoiding application of pressure.

6. A method of extruding an electrode material in accordance with claim 5 which comprises feeding the batch material by allowing it to drop through an opening in the extruder barrel onto screws in the extruder barrel.

7. A method of extruding an electrode material in accordance with claim 1 which comprises feeding the batch material to a twin screw extruder while rotating the screws in a counter-rotational manner.

8. A method of extruding an electrode material in accordance with claim 1 which comprises feeding the batch material to a flighted portion of a twin screw extruder, conveying the material to an unflighted portion of the twin screw extruder, and extruding the material in twin tubular form from the unflighted portion.

9. A method in accordance with claim 8 which comprises generating a small, back pressure as the material flows through the unflighted portion of the extruder and is extruded through the forming member, generating a sufficient, counter pressure in the flighted portion to convey the material forward and to fibrillate the PTFE to a limited degree.

10. A method in accordance with claim 8 which comprises extruding the twin tubular form to a blade which slices the tube horizontally to form two half-tubes for further processing.

* * * * *